C. L. AVERY.
PLOW.
APPLICATION FILED AUG. 24, 1908.
921,578.
Patented May 11, 1909.
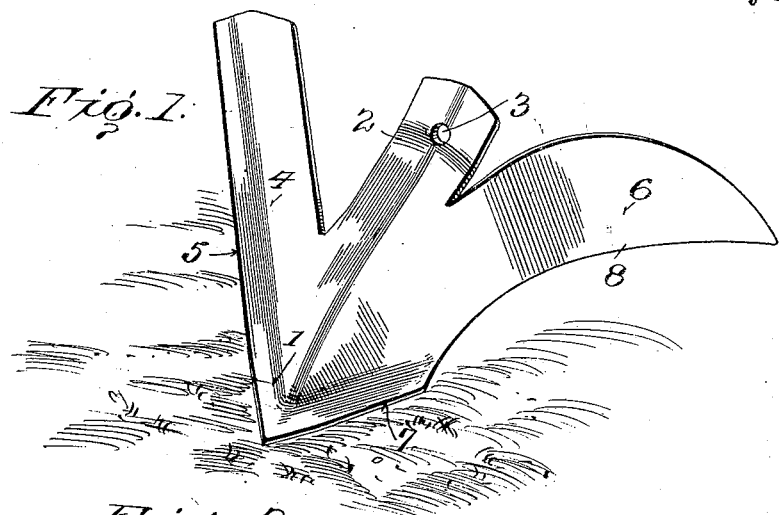
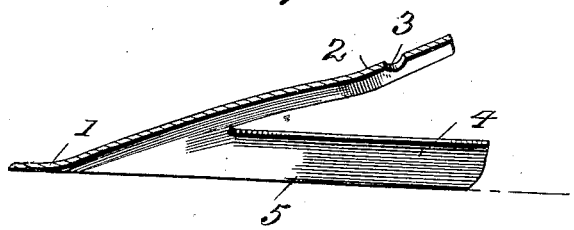
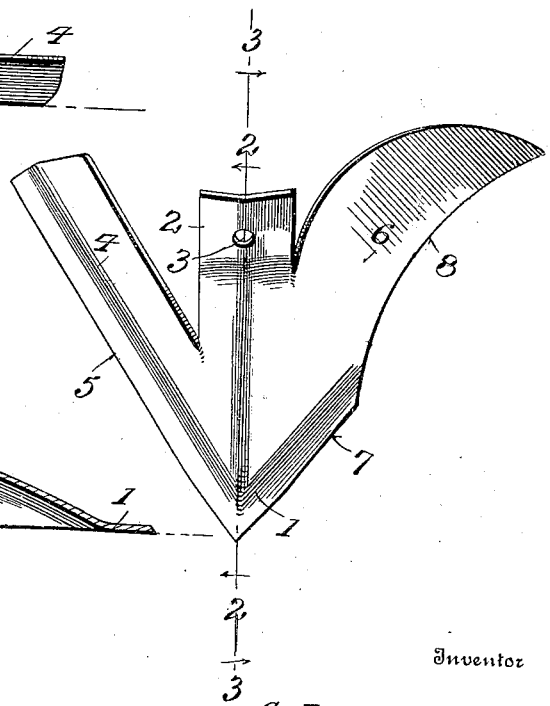
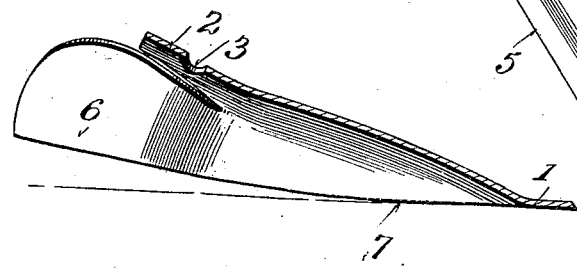
Witnesses
Inventor
C. L. Avery.
By
Attorneys

UNITED STATES PATENT OFFICE.

CHARLES LAFAYETTE AVERY, OF AVERY, TEXAS.

PLOW.

No. 921,578.  Specification of Letters Patent.  Patented May 11, 1909.

Application filed August 24, 1908. Serial No. 450,001.

*To all whom it may concern:*

Be it known that I, CHARLES L. AVERY, citizen of the United States, residing at Avery, in the county of Red River and State of Texas, have invented certain new and useful Improvements in Plows, of which the following is a specification.

This invention comprehends certain new and useful improvements in agricultural implements relating more particularly to that type known as cultivators, and the object of the invention is an improved plow which is adapted particularly for use in the cultivation of cotton, corn or the like, and which is arranged to loosen the surface earth between the rows of plants as it is moved forwardly between the same and to also cover up or cut down any weeds or the like therebetween, said plow also embodying means for turning part of the earth to the growing plants to leave the young crops low so as to better receive the next cultivating and thus performing two operations simultaneously and effecting a material economy in the time and labor involved in the cultivation of the crops.

With this and other objects in view that will more fully appear as the description proceeds, the invention consists of certain constructions, arrangements and combinations of the parts that I shall hereinafter fully describe and then point out the novel features thereof in the appended claim.

For a full understanding of the invention, reference is to be had to the following description and accompanying drawings, in which:

Figure 1 is a perspective view of a plow constructed in accordance with my invention. Fig. 2 is a longitudinal section thereof, showing the sweep, the section being taken on the line 2—2 of Fig. 4. Fig. 3 is a similar view, showing the relative position of the turning blade, the section being taken on the line 3—3 of Fig. 4, and Fig. 4 is a top plan view thereof.

Corresponding and like parts are referred to in the following description and indicated in all the views of the drawings by the same reference characters.

In carrying out my invention I provide a plow having a point 1 and formed above the point and in longitudinal alinement therewith, with a rearwardly inclined shank 2 that is perforated as indicated at 3 to receive a bolt, or is otherwise suitably arranged for attachment to the plow standard or boot. On one side of the plow point 1 is provided a laterally disposed relatively narrow and substantially flat sweep 4, the forward or cutting edge 5 of which is designed to pass through the ground just below the surface to loosen the soil and to prevent it from drying out so fast and also to cut down or cover up any weeds or the like.

6 designates a turning blade that is formed on the opposite side of the plow point and extends rearwardly in divergent relation to the sweep, the forward portion of said blade or the part adjacent to the plow point being formed with a cutting edge 7 which is designed to enter the ground, while the rear end of the blade is outwardly and upwardly curved, as shown, and is preferably recessed in its forward edge, as indicated at 8, so as to clear the surface of the soil.

It is to be particularly observed that the sweep 4 and the turning blade are offset from the plane of the shank 2, while their cutting edges 5 and 7 meet at the point 1 and are arranged substantially in the plane thereof.

From the foregoing description in connection with the accompanying drawing, it will be apparent that I have provided an improved cultivating plow which may be advantageously applied to any of the cultivators now in use and which is arranged as it is run between the rows of plants to loosen the surface of the earth and destroy the weeds and at the same time turn some of the soil lightly around and above the stalks and roots of one of the rows of plants, it being evident that with the arrangement of parts before described, the plow will not enter the ground too deep to injure the vegetation. It is to be further noted that my improved plow is simple and durable in construction and may be formed in one piece, either by being cast or stamped from an integral sheet of blank material, and is thus susceptible of being easily and cheaply manufactured so as to be placed upon the market at a price not too great to prevent its general adoption.

Having thus described the invention, what is claimed as new is:

A cultivating plow of the character described, comprising a point, an inclined shank disposed rearwardly from and in longitudinal alinement with the point, a relatively narrow and substantially flat sweep provided upon one side of the point and having its forward edge constituting a cutting edge 5, and a turning blade formed on the opposite side of the point with its forward portion adjacent thereto provided with a cutting edge 7, the rear portion of the blade being upwardly and laterally curved and being recessed in its forward edge so as to clear the surface of the ground, the sweep and the blade being disposed rearwardly and obliquely to the shank and offset from the plane thereof, and the cutting edges 5 and 7 meeting at and lying substantially in the plane of the point.

In testimony whereof I affix my signature in presence of two witnesses.

CHARLES LAFAYETTE AVERY. [L. S.]

Witnesses:
E. M. ADAMS,
T. E. LAWSON.